United States Patent Office 3,437,140
Patented Apr. 8, 1969

3,437,140
WATERFLOOD PROCESS TAKING ADVANTAGE OF CHROMATOGRAPHIC DISPERSION
William R. Foster, Billy G. Hurd, and Peggy M. Dunlap, Dallas, Tex., assignors to Mobil Oil Corporation, a corporation of New York
Filed Oct. 9, 1967, Ser. No. 673,687
Int. Cl. E21b 43/20; C09k 3/00
U.S. Cl. 166—273                    8 Claims

ABSTRACT OF THE DISCLOSURE

This specification discloses a method of using more effectively a surfactant, having a high molecular weight component and a low molecular weight component, in a flooding operation to recover oil from an oil-containing subterranean formation. Specifically, following the injection into a subterranean formation of an aqueous saline solution of the surfactant, there is injected into the formation a slug of aqueous, less-saline solution of the low molecular weight component of the surfactant. The slug of aqueous, less-saline solution desorbs from the formation the adsorbed high molecular weight component of the surfactant, builds a second bank of surfactant solution, and enables traversing substantially the entire formation with surfactant solution, thus effecting more nearly complete recovery of oil therefrom.

BACKGROUND OF THE INVENTION

This invention pertains to recovery of petroleum from a subterranean formation. More particularly, this invention pertains to recovering petroleum from a subterranean formation by waterflooding.

The petroleum, more commonly called crude oil or simply oil, accumulated in subterranean formations is recovered or produced therefrom through wells drilled into the subterranean formation. A large amount of the oil is left in the subterranean formation if produced only by primary depletion, i.e., where only the initial formation energy is used to recover the oil. Where the initial formation energy is inadequate or has become depleted, supplemental operations are employed. The supplemental operations are often referred to as secondary recovery operations although, in fact, they may be primary or tertiary in sequence of their employment.

In a successful and widely used supplemental operation, a fluid is injected through injection means, comprising one or more injection wells, and passed into the formation. Oil is displaced within and is moved through the formation, and is produced through production means, comprising one or more production wells, as the injected fluid passes from the injection means toward the production means. In a particular recovery operation of this sort, water is employed as the injected fluid and the operation is referred to as a waterflood. The injected water is referred to as the flooding water, as distinguished from the in-situ, or connate, water.

Waterflooding is a useful method of supplementing recovery of oil from subterranean formations. It has, however, a relatively poor microscopic displacement efficiency. The microscopic displacement efficiency may be defined as the ratio of the amount of oil displaced from the pore space of the portion of the formation through which the water has passed to the original amount of oil therein. Adding surfactants to a portion of the flooding water to form a surfactant solution has been suggested for improving this microscopic displacement efficiency. However, employing adequate surfactant to enhance the recovery of oil from the subterrean formation by the flooding water has not been economically feasible heretofore because the surfactants, particularly the higher molecular weight surfactants, are adsorbed from the surfactant solution onto the surfaces of the pores of the subterranean formation. As a result of this adsorption of the surfactant, the concentration of the surfactant in the flooding water becomes less than that required to achieve enhanced recovery of the oil. Moreover, the adsorption, where the surfactant is a mixture, causes a chromatographic dispersion resulting in the separation of components of the surfactant on the basis of molecular weights. Frequently, this dispersion destroys the efficacy of the surfactant mixture in lowering the interfacial tension between the flooding water and the oil being displaced within the formation.

SUMMARY OF THE INVENTION

In accordance with the invention, enhanced recovery of oil is effected from an oil-containing subterranean formation having injection means and production means by the steps comprising: (a) injecting through an injection well and into the subterranean formation an aqueous saline surfactant solution containing a surfactant having a high molecular weight component and a low molecular weight component, (b) injecting through the injection well and into the subterranean formation a slug of aqueous less-saline solution containing dissolved therein a minor amount of the low molecular weight component of the surfactant, and (c) injecting saline flooding water through the injection well. The high molecular weight component of the surfactant adsorbed onto the surface of the pores of the subterranean formation from the saline solution of surfactant is desorbed by the slug of less-saline solution containing the low molecular weight component, building a second bank of surfactant which is effective in displacing oil within the subterranean formation. The term "saline," as used herein, is intended to refer to sodium chloride.

DESCRIPTION OF SPECIFIC EMBODIMENTS

Figure 1:
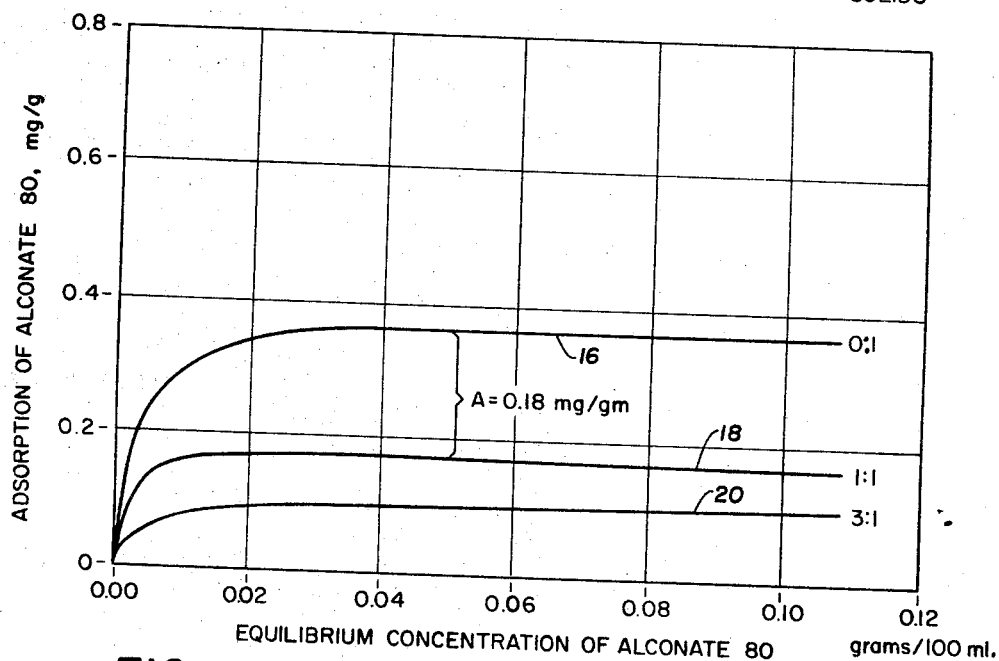
FIGURE 1 illustrates adsorption isotherms for a surfactant in solutions having varying salinities.

The invention is applicable wherever a surfactant, which has a high molecular weight component and a low molecular weight component, is employed. Illustrative of such surfactants are mixtures of alkyl aryl sulfonates. Preferred surfactants are restricted mixtures of petroleum sulfonates having a median molecular weight of from about 375 to about 430, having molecular weights between 290 and 590, no more than 10 percent by weight thereof having an average molecular weight less than 290, and no more than 15 percent by weight thereof having an average molecular weight greater than 590. Hereinafter, the petroleum sulfonates described above are referred to by the term "the restricted petroleum sulfonates." Particularly preferred surfactants are the restricted petroleum sulfonates that have a median molecular weight restricted from about 400 to about 430 and otherwise have the molecular weight distribution of the restricted petroleum sulfonates outlined above. The petroleum sulfonates may be natural petroleum sulfonates prepared from a crude oil or refinery stream or synthetic petroleum sulfonates prepared from alkyl aryl fractions synthesized in various chemical reactions.

Ordinarily, mixtures of petroleum sulfonates will be comprised of several high molecular weight components and several low molecular weight components. With such mixtures, an optimum interfacial tension is effected. Hence, a greater displacement of oil within the subterranean formation is effected by proper mixture of the high molecular weight components and the low molecular weight components. A suitable mixture of petroleum sulfonates contains, as the high molecular weight components, petroleum sulfonates having molecular weights as high as 590 and a median molecular weight of from about 410 to about 450, and, as the low molecular weight components, petroleum sulfonates having molecular weights as low as 290 and a median molecular weight of from about 340 to about 380.

The molecular weights referred to above and hereinafter in connection with petroleum sulfonates are those of the sodium salts. Moreover, the term "molecular weight" should be understood to mean equivalent weight, which is defined as molecular weight per sulfonate group. The term "molecular weight" is used because it is commonly applied by manufacturers of petroleum sulfonates in describing their products.

The surfactant is preferably employed in the aqueous saline surfactant solution in an amount sufficient to reduce the interfacial tension between the surfactant solution and the oil to below 0.1 dyne per centimeter. Still more preferably, a surfactant is employed, and in an amount, which will effect an interfacial tension of from about 0.01 to about 0.001 dyne per centimeter, or less. Ordinarily, a concentration of surfactant in the aqueous saline surfactant solution prior to injection of from about 0.01 percent by weight to about 25 percent by weight is adequate. When the restricted petroleum sulfonates are employed as the surfactant, the lowest interfacial tensions are effected between the surfactant solution and the oil being displaced within the formation by a concentration of surfactant within the formation of from about 0.01 to about 0.5 percent by weight of the surfactant solution.

As mentioned, there is a chromatographic dispersion of mixtures of surfactants caused by adsorption of the surfactant on the surfaces of the pores of the subterranean formation. The higher molecular weight components are adsorbed preferentially to the lower molecular weight components. Thus, the aqueous saline surfactant solution injected into the subterranean formation should have a higher concentration of the surfactant in order to obtain the desired concentration of the higher molecular weight component in the solution passing through the subterranean formation. When employing petroleum sulfonates, for example, the injected solution should have a concentration of the petroleum sulfonates higher than 0.5 percent by weight. The injected petroleum sulfonate solution may contain a concentration of from about 1 to about 25 percent by weight of the petroleum sulfonates.

The presence of the sodium chloride in the surfactant solution effects a lower interfacial tension between the surfactant solution and the oil in the formation than would be effected in the absence of the sodium chloride. The microscopic displacement efficiency of the surfactant solution is inversely proportional to the interfacial tension between the solution and the oil. Consequently, the presence of the sodium chloride in the surfactant solution improves the microscopic displacement efficiency of the surfactant solution. Thus, from the standpoint of obtaining maximum recovery of oil, surfactant solutions for injecting into a subterranean formation will contain sodium chloride. Moreover, the presence of the sodium chloride in the aqueous surfactant solution reduces swelling and dispersion of clays in the formation, which swelling and dispersion reduces the permeability of the formation to injected liquid. The surfactant solution will contain about 1 to 2 percent by weight of sodium chloride. Further, the waters available in oil fields for the preparation of surfactant solution for injection into a subterranean formation ordinarily contain sodium chloride in addition to other dissolved salts. Thus, often from the standpoint of practicality, as well as from the standpoint of obtaining maximum recovery of oil, the surfactant solutions for injecting into a subterranean formation will be saline. On the other hand, the presence of sodium chloride in the surfactant solution is conducive to adsorption of the surfactant on the surfaces of the pores of the formation. Moreover, while the presence of sodium chloride in the surfactant solution decreases the interfacial tension between the surfactant solution and the oil in the formation, a high concentration of sodium chloride is chemically incompatible with the surfactant. Preferably, the saline surfactant solution should not contain in excess of the 2 percent by weight of sodium chloride. Further, salts having divalent cations, i.e., calcium and magnesium salts, are also chemically incompatible with the surfactant and, preferably, the saline surfactant solution is essentially free of such salts.

The aqueous saline surfactant solution is injected into the formation in the amount of from about 0.01 to about 0.2 pore volume of the portion of the formation through which the solution will pass. Greater amounts of surfactant solution may be employed and, with increasing amounts, the amount of oil recovered will also be increased. However, as is known, the additional amount of oil recovered may have a value which is equal to or less than the cost of employing the greater amounts of surfactant solution.

Following the injection of the aqueous saline surfactant solution into the subterranean formation, the slug of aqueous, less-saline solution is injected into the formation. This slug of aqueous, less-saline solution should have a sufficient concentration of the low molecular weight component of the surfactant to provide an effective surfactant bank when the high molecular weight component of the surfactant has been desorbed from the subterranean formation and dissolved in the aqueous, less-saline solution. This need be only a minor amount. A concentration of from about 0.0002 to about 0.03 percent by weight ordinarily is adequate. Of course, the slug of aqueous, less-saline solution may contain the high molecular weight component in addition to the low molecular weight component. However, this is not essential and adds to the cost of the oil recovery.

The effectiveness of the slug of aqueous, less-saline solution injected into the subterranean formation subsequent to the saline solution of surfactant, from the standpoint of desorbing the surfactant adsorbed onto the surfaces of the pores of the formation, is dependent primarily upon its content of sodium chloride. With a lower content of sodium chloride, i.e., with the solution being less-saline, the effectiveness of the solution for desorbing surfactant is increased. The slug of less-saline solution should have a content of sodium chloride which is less than about 50 percent of that of the aqueous saline surfactant solution. Preferably, the salt content of the less-saline solution should be lower. Thus, the salt content of the less-saline solution may be as low as 10 to 20 percent of that of the saline surfactant solution. Further, the less-saline solution is preferably free of salts having divalent cations since these, as mentioned in connection with the saline surfactant solution, are chemically incompatible with the surfactant. In situations where it can be used, the less-saline solution is prepared using fresh water, i.e., has a salt content not in excess of that of potable water.

As mentioned previously in connection with the aqueous saline surfactant solution, the presence of sodium chloride in the solution reduces swelling and dispersion of clays in the formation. Certain subterranean formations contain clays which swell and disperse on contant with water having a salt content less than that of the connate water in the formation. The swelling and dispersion of these clays, also mentioned in connection with the aqueous saline surfactant solution, reduces the permeability of the formation to injected liquid, and this reduction in permeability may be to an extent that the injection of liquid cannot be effected at a desired rate or can be effected at a desired rate only by employing impractically high pressures. In such cases, reduction in permeability may be avoided by employing a slug of less-saline solution having a salt content at least equal to that of the connate water in the formation. However, this salt content must still be less than about 50 percent of that of the surfactant solution.

The slug of less-saline solution injected into the subterranean formation should be greater in amount than the aqueous saline surfactant solution. Preferably, the slug of less-saline solution should be injected in the amount of from about 0.05 to about 0.25 pore volume of the portion of the formation through which the solution will pass.

Following the injection of the less-saline solution into the formation, flooding water is injected into the formation. Any type of water heretofore found suitable for waterflooding in a subterranean formation may be employed. Ordinarily, the water available for use as a flooding water is an oil field brine, i.e., water containing sodium chloride, and other salts, along with oil from a subterranean formation. Regardless, the use of water containing sodium chloride is required in subterranean formations which contain clays which swell and disperse upon contact with fresh water.

The flooding water may be injected into the subterranean formation in amounts heretofore employed in waterflooding.

Returning to the injection of the aqueous saline surfactant solution, a high concentration of sodium chloride and salts having divalent cations, as mentioned, are chemically incompatible with the surfactant. The connate water in various formations contains sodium chloride, or salts having divalent cations, or both, in sufficiently high concentration to be chemically incompatible with the surfactant. In the practice of the invention, where the connate water of the subterranean formation contains sodium chloride in a concentration in excess of 2 percent by weight or salts having divalent cations in amounts incompatible with the surfactant, prior to injecting the saline surfactant solution into the formation, an aqueous buffer liquid should be injected into the formation. This aqueous buffer liquid may be fresh water where the formation does not contain clays which swell and disperse upon contact with fresh water. Preferably, the aqueous buffer liquid is an aqueous solution of sodium chloride free of salts having divalent cations. Where an aqueous solution of sodium chloride is used, it should have a concentration of sodium chloride no more than 2 percent by weight. Preferably, where an aqueous solution of sodium chloride is used, its concentration of sodium chloride should be about the same as that of the aqueous saline solution of surfactant. The aqueous buffer liquid is injected into the formation in the amount of from about 0.01 to about 0.2 pore volume of the formation through which it passes. The aqueous buffer liquid miscibly displaces the connate water from the formation, leaving an environment with which the saline solution of surfactant is chemically compatible.

Returning to the injection of the less-saline solution, where the use of such a solution prepared from fresh water or from water which is less saline than the connate water is required, and the formation contains clay which will swell and disperse upon contact with the less-saline solution, various steps can be taken to avoid reduction in permeability of the formation to below an acceptable value. These steps involve stabilization of the clay. As is known, the effects of a reduced permeability upon the injection of a fluid into a formation are greatest within the immediate vicinity of the injection well. Thus, stabilization of the clay within the formation need be effected only for a limited distance into the formation from the well. For example, stabilization need be effected for a distance into the formation of about 10 feet from the well. Further, the stabilization procedure need not effect a permanent stabilization of the clay. Rather, the stabilization procedure need effect stabilization of the clay only for a time necessary to complete injection into the formation of the desired amount of flooding water.

Any suitable clay stabilization procedure may be employed. For example, water containing potassium salts may be injected into the formation. Further, for example, the clay may be stabilized by irreversibly dehydrating them by heating. For heating the clays, superheated steam may be employed.

Returning to the injection of the flooding water, where the flooding water contains sodium chloride or salts having divalent cations, or both, in sufficiently high concentrations to be chemically incompatible with the surfactant in the slug of less-saline solution, it is preferred to avoid contact of the flooding water with the less-saline solution. Thus, where the flooding water contains sodium chloride in a concentration in excess of 2 percent by weight or is not essentially free of salts having divalent cations, following the injection of the less-saline solution and before injecting the flooding water, an aqueous buffer liquid is injected into the formation. This aqueous buffer liquid may be fresh water where the formation does not contain clays which swell and disperse upon contact with fresh water or where stabilization has been effected. Preferably, this aqueous buffer liquid is an aqueous solution of sodium chloride free of salts having divalent cations. Where an aqueous solution of sodium chloride is used, it should have a concentration of sodium chloride no more than 2 percent by weight. Preferably, where an aqueous solution of sodium chloride is used, its concentration of sodium chloride should be about the same as that of the less-saline solution. The aqueous buffer liquid is injected into the formation in the amount of from 0.01 to about 0.2 pore volume of the formation through which it passes. The aqueous buffer liquid miscibly displaces the less-saline solution from the formation preventing contact of the less-saline solution with the flooding water.

In the procedure of the invention, as the aqueous saline surfactant solution passes through the subterranean formation, the solution gradually becomes depleted of the higher molecular weight component of the surfactant by adsorption of this component on the surfaces of the pores of the formation. Thus, at some point in the formation, the saline surfactant solution will become sufficiently depleted of the higher molecular weight component that the effect of the combination of the higher molecular weight component and the lower molecular weight component on the interfacial tension between the oil in the formation and the saline surfactant solution is lost. However, the slug of less-saline solution following the saline surfactant solution desorbs the higher molecular weight component from the formation and as it passes through the formation its content, within limits, of the higher molecular weight component of the surfactant gradually becomes greater. Further, this less-saline solution contains the lower molecular weight component and as the higher molecular weight component is desorbed from the formation by the less-saline solution it combines its effect with that of the lower molecular weight component on the interfacial tension between the oil in the formation and the less-saline solution. Thus, as the aqueous saline surfactant solution gradually loses its effect on the interfacial tension between itself and the oil in the formation, the slug of less-saline solution gradually increases its effect on the interfacial tension between itself and the oil in the formation. At the point in the formation where the aqueous saline surfactant solution loses the effect of the combination of the higher and lower molecular weight components of the surfactant by depletion of the higher molecular weight component, the slug of less-saline solution will contain desorbed higher molecular weight component. Thus, there moves through the formation a body of surfactant solution comprising the aqueous saline surfactant solution and the slug of less-saline solution which has a minimum change in effect on the interfacial tension between itself and the oil in the formation. Accordingly, efficient utilization of the surfactant and recovery of oil are obtained despite adsorption of the surfactant on the surfaces of the pores of the formation.

In carrying out the invention, conventional equipment, such as wells, mixing tanks, pumps, and piping, which is ordinarily employed in waterflooding operations may be employed. Furthermore, the production equipment, such as water knockouts, emulsion breakers, oil and gas separators, liquid level controls, backpressure controls, piping, storage tanks, and custody transfer equipment, may be employed in their conventional usage. The mixing of the solutions described herein poses no unusual problems which require further amplification. However, the aqueous saline surfactant solution, and the less-saline solution where it contains sodium chloride, will effect a significantly lower interfacial tension between itself and the oil when the surfactant is first dissolved in fresh water and admixed with water containing sodium chloride to form the solution containing the desired concentration of sodium chloride.

The following examples will be further illustrative of the invention.

EXAMPLE 1

This example will illustrate the effect of salinity on the adsorption of higher molecular weight petroleum sulfonates from an aqueous saline surfactant solution on the surfaces of the pores of a subterranean formation.

In this example, three sets of solutions containing various known concentrations of petroleum sulfonates were prepared. The petroleum sulfonates employed were a commercial mixture sold under the trade name of Alconate 80 and containing 80 percent by weight of petroleum sulfonates and in the form of the sodium salts. These petroleum sulfonates have an average molecular weight of about 440 and a median molecular weight of 418. One set of solutions was prepared employing an oil field brine, specifically brine produced along with oil from the Upper Upper Loma Novia Sand, Loma Novia Field, Duval County, Texas. This brine contains about 1.2 percent by weight of sodium chloride and a minor amount of other dissolved salts. One other set of solutions was prepared employing Loma Novia brine diluted with an equal amount of substantially fresh water. The third set of solutions was prepared employing Loma Novia brine diluted with substantially fresh water in the ratio of 1 volume of Loma Novia brine to 3 volumes of the substantially fresh water. To each solution in each of the three sets were added 0.05 percent by weight of sodium carbonate and 0.1 percent by weight of sodium tripolyphosphate. These latter two salts, along with sodium chloride, the sodium chloride in this case being provided by the brine, provide an enhanced lowering of interfacial tension between petroleum sulfonate solution and oil in a subterranean formation and are used with petroleum sulfonates in waterflooding for this purpose.

To 25 milliliter portions of each of the solutions in the three sets were added 5 grams of disassociated core sample obtained from the Upper Upper Loma Novia Sand. The core sample, prior to being added to the solutions, had been washed with tap water. Each of the solutions was permitted to attain equilibrium of adsorption of the petroleum sulfonate on the core sample and then the solution was analyzed for its content of petroleum sulfonate.

From the analysis, and knowing the initial concentration of the petroleum sulfonates, the amount of petroleum sulfonate adsorbed per unit weight of core sample was calculated. The results are given in FIGURE 1. In the figure, the abscissa is the equilibrium concentration of the Alconate 80 in grams per 100 milliliters of solution and the ordinate is the amount of petroleum sulfonate adsorbed on the core sample in milligrams of Alconate 80 per gram of core sample. Curve 16 is the adsorption isotherm for the petroleum sulfonate in the Loma Novia brine and curves 18 and 20 are the adsorption isotherms for the petroleum sulfonates in the one to one and the three to one dilution, respectively, of the Loma Novia brine.

It will be observed from FIGURE 1 that with decreasing concentration of sodium chloride, the amount of petroleum sulfonates adsorbed decreases. Thus, less-saline solution injected into a subterranean formation after an aqueous saline surfactant solution will desorb components of the surfactant from the subterranean formation in amounts dependent on the difference between the sodium chloride concentrations of the two solutions. For example, assume that the aqueous saline solution of surfactant was perpared from Loma Novia brine and contained enough Alconate 80 to saturate the formation, i.e., 0.36 milligram per gram of formation, which is the maximum amount adsorbed as represented by the straight line portion of curve 6. A less-saline solution comprising Loma Novia brine diluted with an equal volume of substantially fresh water would permit adsorption of only 0.18 milligram of Alconate 80 per gram of formation at a minimum as represented by the straight line portion of curve 18. Thus, this latter solution would desorb the amount A, equal to 0.18 milligram of surfactant per gram of formation, i.e., the difference between the straight line portions of curves 16 and 18.

EXAMPLE 2

This example illustrates that a slug of less-saline solution will desorb and dissolve surfactant which has been adsorbed from an aqueous saline surfactant solution and build a concentrated bank of surfactant.

In this example, a Lucite tube one inch in diameter by twelve inches long was packed with disassociated core sample from the Upper Upper Loma Novia Sand. This core sample had been previously washed with tap water. The pore volume of the pack was measured, this measurement being made by determining the amount of liquid taken up by the pack following evacuation. The pack was saturated with the Loma Novia brine employed in Example 1, and the following solutions were successively injected into the pack:

(1) 0.1 pore volume of Loma Novia brine containing 3 percent by weight of sodium carbonate,[1]

(2) 0.03 pore volume of Loma Novia brine containing 0.1 percent by weight of sodium carbonate and 0.1 percent by weight of sodium tripolyphosphate,[1]

(3) 0.1 pore volume of aqueous saline solution of surfactant consisting of Loma Novia brine containing 1 percent by weight of Alconate 80, 0.05 percent by weight of sodium carbonate, and 0.1 percent by weight of sodium tripolyphosphate,[2] and (4) Loma Novia brine containing 0.05 percent by weight of sodium carbonate, and 0.1 percent by weight of sodium tripolyphosphate.[2]

The last solution was injected until about 2.5 pore volumes had been injected and the concentration of Al-

---

[1] The sodium carbonate, and the combination of sodium carbonate and sodium tripolyphosphate, are included in the Loma Novia brine to reduce the adsorption of the surfactant onto the core sample.

[2] The sodium carbonate, and the combination of sodium carbonate and sodium tripolyphosphate, are included in the solution of surfactant since these, along with the sodium chloride, would usually decrease interfacial tension between the surfactant solution and the oil in the formation and improve the water wettability.

conate 80 in the effluent had decreased to essentially zero.

Thereafter, a slug of aqueous, less-saline solution consisting of one part of the Loma Novia brine and three parts of substantially fresh water was prepared. Added to this solution were 0.05 percent by weight of sodium carbonate and 0.1 percent by weight of sodium tripolyphosphate. The sodium carbonate and the sodium tripolyphosphate were added to the solution since, as mentioned in the footnotes, these would be employed, along with the sodium chloride, in a field operation to obtain desired interfacial behavior. The solution was then injected into the pack and the concentrations of Alconate 80 in the effluent were determined.

Figure 2:
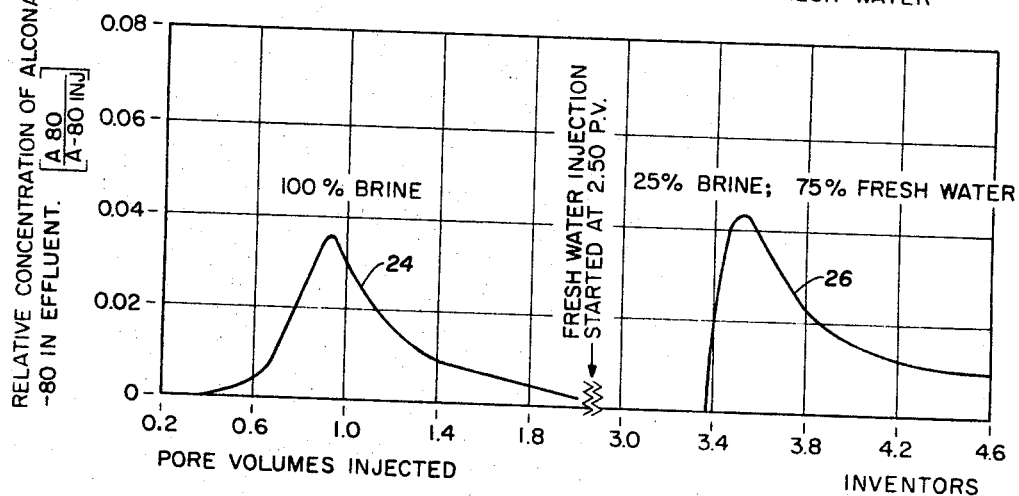
FIGURE 2 illustrates the effect of a slug of water having a lower salinity flowed behind a solution of surfactant having a higher salinity.

The results are shown in FIGURE 2. In FIGURE 2 the relative concentration of Alconate 80 in the effluent compared to the concentration of Alconate 80 in the aqueous saline surfactant solution is the ordinate and the pore volumes of injected liquid, i.e., the solution No. 4 and the aqueous less-saline solution, into the pack is the abscissa. The first peak 24 represents an increase in concentration of Alconate 80 just prior to the injection of 1 pore volume of solution No. 4. The second peak 26 shows that, just prior to the injection of one pore volume of the less-saline solution, the concentration of Alconate 80 in the effluent began to increase and after approximately one pore volume had been injected (approximately 3.5 total pore volumes of liquid) reached a maximum concentration greater than that obtained from solution No. 4. This second bank of surfactant solution was formed from desorption of surfactant left by the first bank of surfactant solution on the solid surfaces.

EXAMPLE 3

This example illustrates that a bank of surfactant obtained from the low molecular weight component of the surfactant already contained in, and the high molecular weight component of the surfactant desorbed by, the aqueous less-saline solution is effective in releasing oil from a pack following a waterflood and a surfactant flood performed on the same pack.

In this example, a copper tube 50 feet long and 0.305 inch in diameter was packed with washed, disassociated core sample from the Loma Novia Sand as described in Example 1. The pack was saturated with Loma Novia brine. Thereafter, Loma Novia crude oil was injected into the pack to an irreducible water saturation, i.e., no more water was displaced from the pack by the injected oil. Thereafter, a waterflood was carried out by injecting Loma Novia brine into the pack. At the end of the waterflood, the end being taken as the point where the water-oil ratio of the effluent exceeded one hundred, the fluid saturation of the pack was 74 percent brine and 26 percent residual oil. Thereafter, the surfactant flood was carried out.

In the surfactant flood, 0.1 pore volume of Loma Novia brine containing 3.8 percent by weight of sodium carbonate was injected. This was followed by 0.05 pore volume of the brine containing 0.05 percent by weight of sodium carbonate and 0.1 percent of sodium tripolyphosphate. Next, there was injected into the pack 0.1 pore volume of the brine containing as surfactant, 2.13 percent by weight of Alconate 80; 0.08 percent by weight of Kelzan, a polysaccharide prepared by the fermentation of glucose by bacterium Xanthomonas campestris NRRL B–1459, United States Department of Agriculture, and used to increase the viscosity of the flooding liquid; 0.02 percent by weight of formaldehyde, used as a preservative for the Kelzan; 0.1 percent by weight of sodium tripolyphosphate; and 0.05 percent by weight of sodium carbonate. Finally, Loma Novia brine containing 0.05 percent by weight of sodium carbonate was injected until no more oil was being removed from the pack in the effluent. Of the residual oil remaining after the normal waterflood, 53.9 percent was produced by this surfactant flood. Stated otherwise, the residual oil saturation was reduced to 12 percent pore volume by the surfactant flood.

Thereafter, a slug of 0.1 pore volume of aqueous less-saline solution consisting of: one part of Loma Novia brine and three parts of substantially fresh water containing 0.002 percent by weight of Pyronate 50, a mixture of synthetic petroleum sulfonates having an average molecular weight of about 360, having a medium molecular weight of about 346, and having molecular weights as low as 289; 0.05 percent by weight of sodium carbonate; and 0.08 percent by weight of Kelzan was passed through the pack.

All of the oil was recovered from the pack. Stated otherwise, the residual oil saturation was reduced to zero by employing the slug of aqueous less-saline solution containing only 0.002 percent by weight of Pyronate 50.

EXAMPLE 4

In this example, comparison is made between the results obtained in the preceding example and the results obtained by following the aqueous saline surfactant solution with a slug of solution containing the low molecular weight component of the surfactant but having the same salinity as the aqueous saline surfactant solution. A laboratory test similar to that reported in Example 3 was carried out in which the pack and all concentrations and volumes in the waterflooding and surfactant flooding were duplicated. The point of difference was that, following the surfactant flooding, a slug of solution consisting of Loma Novia brine containing 0.002 percent by weight of Pyronate 50 was injected into the pack. At equilibrium, the residual oil saturation was reduced to 6.5 percent pore volume. Thus, the inclusion of the same amount of Pyronate 50 in the pore volume of solution, but the solution having the same salinity as the aqueous saline surfactant solution, recovered only 68.5 percent of the residual oil left in place at the end of the waterflood.

What is claimed is:

1. A method of recovering oil from an oil-containing subterranean formation having at least one injection well and at least one production well, comprising the steps of:
   (a) injecting through an injection well and into said subterranean formation an aqueous saline surfactant solution containing a surfactant, said surfactant having a high molecular weight component and a low molecular weight component, said high molecular weight component being adsorbed preferentially to said low molecular weight component on the surfaces of said subterranean formation,
   (b) injecting through said injection well and into said subterranean formation a slug of aqueous less-saline solution containing a minor amount of said low molecular weight component of said surfactant, and
   (c) injecting saline flooding water through said injection well and into said subterranean formation.

2. The method of claim 1 wherein said surfactant comprises a mixture of petroleum sulfonates having, in the form of the sodium salts, a median molecular weight of from about 375 to about 430, having molecular weights between 290 and 590, no more than 10 percent by weight having an average molecular weight of less than 290, and no more than 15 percent by weight having an average molecular weight greater than 590.

3. The method of claim 2 wherein said petroleum sulfonates have a median molecular weight of from about 400 to about 430.

4. The method of claim 2 wherein said petroleum sulfonates are formed by admixing a mixture of high molecular weight petroleum sulfonates having molecular weights as high as 590 and having a median molecular weight of from about 410 to about 450 and a mixture of low molecular weight petroleum sulfonates having molecular weights as low as 290 and having a median molecular weight of from about 340 to about 380.

5. The method of claim 1 wherein said aqueous less-saline solution has a salinity of less than about 50 percent of the salinity of said aqueous saline surfactant solution.

6. The method of claim 5 wherein said aqueous less-saline solution has a salinity of 10 to 20 percent of the salinity of said aqueous saline surfactant solution.

7. The method of claim 5 wherein said aqueous less-saline solution is substantially free of sodium chloride.

8. The method of claim 1 wherein said low molecular weight component of said surfactant is present in said aqueous less-saline solution of step (b) in a concentration of from about 0.0002 to about 0.03 percent by weight.

References Cited

UNITED STATES PATENTS

| 3,175,160 | 3/1965 | Osoba | 166—9 |
| 3,289,759 | 12/1966 | Fisher | 166—9 |
| 3,302,713 | 2/1967 | Ahearn et al. | 166—9 |
| 3,348,611 | 10/1967 | Reisberg | 166—9 |

CHARLES E. O'CONNELL, *Primary Examiner.*

JAN A. CALVERT, *Assistant Examiner.*

U.S. Cl. X.R.

252—8.55